United States Patent [19]
Yokota et al.

[11] Patent Number: 5,266,139
[45] Date of Patent: Nov. 30, 1993

[54] CONTINUOUS PROCESSING/IN-SITU CURING OF INCREMENTALLY APPLIED RESIN MATRIX COMPOSITE MATERIALS

[75] Inventors: Michael J. Yokota; Edward M. Gilchrist; Douglas S. Cox; Ivan K. Hall; John Gagliani, all of San Diego, Calif.; Ronald K. Giesy, Katy, Tex.

[73] Assignee: General Dynamics Corporation, Space Systems Division, San Diego, Calif.

[21] Appl. No.: 955,631

[22] Filed: Oct. 2, 1992

[51] Int. Cl.⁵ ............................................. B65H 81/00
[52] U.S. Cl. ..................... 156/169; 156/173; 156/175; 156/64; 156/94; 156/158; 156/272.6; 156/425; 156/574; 156/180
[58] Field of Search ................ 156/64, 94, 157, 158, 156/166, 169, 173, 175, 272.6, 425, 433, 574, 523, 361, 180, 359, 181

[56] References Cited

U.S. PATENT DOCUMENTS

| | | | |
|---|---|---|---|
| H219 | 2/1987 | Sayles | 156/169 |
| 2,467,999 | 4/1949 | Stephens | 156/169 X |
| 3,148,102 | 9/1964 | Eakins et al. | 156/169 X |
| 3,574,040 | 4/1971 | Chitwood et al. | 156/522 |
| 3,715,252 | 2/1973 | Fairbairn | 156/173 X |
| 3,844,822 | 10/1974 | Boss et al. | 118/70 X |
| 4,078,957 | 3/1978 | Bradt | 156/173 |
| 4,409,270 | 10/1983 | Faber et al. | 156/94 X |
| 4,428,992 | 1/1984 | Street | 156/158 X |
| 4,456,495 | 6/1984 | Doellinger et al. | 156/173 X |
| 4,569,716 | 2/1986 | Pugh | 156/574 X |
| 4,780,166 | 10/1988 | Hunter | 156/64 X |
| 4,869,761 | 9/1989 | Weingart et al. | 156/169 X |

FOREIGN PATENT DOCUMENTS

| | | | |
|---|---|---|---|
| 1-1734 | 1/1989 | Japan | 156/272.6 |
| 516388 | 1/1972 | Switzerland | 156/175 |
| 1177050 | 1/1970 | United Kingdom | 156/173 |
| 2053026 | 2/1981 | United Kingdom | 156/272.6 |
| 2213793 | 8/1989 | United Kingdom | 156/244.24 |

*Primary Examiner*—Jeff H. Aftergut
*Attorney, Agent, or Firm*—John R. Duncan

[57] ABSTRACT

A method for continuous processing/in-situ consolidation and curing of thermoset resin impregnated fiber tow into a composite product having minimal porosity and being relatively void free. The method provides for preconditioning a fiber, impregnating a continuous fiber tow with a low viscosity thermoset resin to complete saturation and then simultaneously outgassing and advancing the resin impregnated tow. The preconditioned tow is then applied to a substrate such as a heated rotating mandrel in a filament winding procedure where heat is applied to the nip of the touch-down of the tow to the mandrel with the simultaneous application of pressure for initial consolidation of the tow upon the substrate. Additional pressure and heat are applied to the tow as the mandrel is rotated to provide for advancing the stage of the resin and further consolidation of the material. The combination of the pressures and heat applied to the outer surface of the material on the mandrel produce a unitary composite product without delaminations. Preferably, the serial continuous process is monitored using an appropriate inspection method focused on the material on the mandrel to permit in-line optimization of the product as it is being consolidated and cured on the mandrel. The method is equally applicable to various automated resin matrix composite material deposition arrangements such as filament winding, tape laying, and pultrusion.

27 Claims, 4 Drawing Sheets

CONTINUOUS PROCESSING/IN-SITU CURING OF INCREMENTALLY APPLIED RESIN MATRIX COMPOSITE MATERIALS

BACKGROUND OF THE INVENTION

1. Field of the Invention

This invention relates to an improvement in the field of manufacturing advanced composite products intended for aerospace applications and more particularly, but not by way of limitation, to a method of using raw thermoset resin materials and carbon or fiberglass tow to manufacture large composite structures without the use of an oven, an autoclave, or a vacuum bag to cure the resin into a large resin matrix composite structure.

2. Description of the Prior Art

The present space transportation fleet of the United States currently depends on the Space Shuttle and three expendable launch vehicles derived from earlier intercontinental ballistic missiles (Delta, Atlas, and Titan) and their more recent derivatives. The cost to launch payload to low earth orbit by these vehicles varies from $3000 to $5000 per pound. Recent national priorities are attempting to reduce both cost and cycle times to launch by a factor of 10 through programs such as the National Launch System (NLS), and National Aero Space Plane (NASP) as well as Shuttle C (Cargo), Liquid Rocket Booster (LRB), and Hybrid Rocket Booster (HRB). Each of the above programs have ambitious goals in the area of performance, reliability and cost.

Composite materials with their significant property and processing advantages will have a large role to play in meeting the performance, reliability and cost goals of the above programs. This role however must be well chosen and designed as the many advantages of composite materials could easily be overwhelmed by poor application or process selection. An obvious composite application for expendable launch vehicles are payload fairings and various adapter structures. For example, the assignee of the present invention is already applying composites to these types of structures on current Atlas and Centaur launch vehicles.

A more challenging composite application for both expendable reusable launch vehicles is liquid hydrogen and liquid oxygen fuel tanks. Use of composites to contain fluids especially at cryogenic temperatures is currently not well established. However, in both dry and wet applications utilization of low cost material forms and producible fabrication methods are key. It appears that for the kinds of closed structures required for NLS and LRB/HRB vehicles, the wet filament winding process will be featured as the principal method of fabrication and the method of the subject invention would have instant application.

However, certain challenges have to be met for advanced composite product manufacture. First, is the cost. Many graphite/epoxy composites are made in the form of "prepreg" tape or fabric impregnated with resin. Such systems are expensive since the cost per pound for the prepreg system is commonly more the a completed end product made from aluminum. Second, technical issues have contributed to the economic difficulties.

One of the basic challenges in creating large composite parts is to achieve through-the-thickness strength, which requires a secure bond between adjacent plies of fiber. This is necessary to prevent delamination and weakening of the material due to impacts or other damage. The general answer of industry has been to switch to new tough resin matrix systems, but these are more expensive than the older resin types and are more difficult to handle.

Most composite parts are still largely hand-made. At the beginning of the 1980's, many manufacturers believed that automated manufacturing would bring down the costs of composite structures. However, it has been found that automated cutting and tape-laying are possible but require very expensive materials, tooling, and development.

Thus, a true need exists in the manufacturing large composite structures at a reasonable cost, a need which is believed to be met by the instant invention. The primary advantages of the instant invention are the elimination of porosity and the ability to achieve a uniform distribution of resin throughout the composite laminate, regardless of thickness, in an incremental yet continuous manner without the use of prepreg materials or vacuum bag, autoclave processes. Commonly used state-of-the-art methods (e.g., vacuum bagging, multiple staging/compaction operations, autoclave curing, matched die processing, etc.) attempt to achieve a porosity free laminate with uniform resin distribution in discrete (non-continuous) steps. The method of the present invention aligns and automates these discrete operations in a continuous, "assembly-line" fashion, thereby accelerating the entire manufacturing cycle. Furthermore, the present invention is effective for processing/fabricating thick composite laminates, which are particularly susceptible to porosity and poor resin distribution.

The effectiveness of the proposed system in eliminating porosity and achieving resin distribution is based on certain features that are incorporated into the processing method of the invention. Specifically, outgassing of the fiber/resin is accomplished ply-by-ply, and a concentrated, focused source of heat helps to simplify the thermal/polymerization gradients that are established as a result of the polymerization reaction of the resin as curing proceeds. A heated compaction roller/head concentrates pressure that inhibits the entrapment of air at the lay down point and provides adequate force to effect complete laminate consolidation.

The typical approach of processing composite parts utilizing convention prepreg materials uses the standard vacuum bagging/autoclave curing approach. This approach has a number of inherent disadvantages. Considerable effort is expended to create the prepreg material which is, in reality, an intermediate product. Generally, it is manufactured to exacting standards primarily using manual processing methods. The prepreg material is catalyzed and is an activated product, and therefore possesses a finite shelf life, generally 1 to 2 weeks at room temperature for most commercially available forms. To retard further aging, it is then necessary to store the prepreg in a suitable freezer. This factor makes fabrication of large parts difficult and very time-dependent.

Due to the aging of the prepreg material, all subsequent processes in the fabrication sequence must be rigidly controlled (i.e., humidity, temperature, time, etc.). Because the standard prepreg/vacuum bag/autoclave process is a "batch process" where the required plies are laminated together (sometimes amounting to many hundreds of plies) and then cured together, there is extreme difficulty in properly controlling resin content throughout the laminate and eliminating all porosity. In fact, for laminates greater that several square feet in area and more than 0.125 inch in thickness manufacturers utilize intermediate deairing, debulking and compacting steps, all leading to increased cost. The primary cause for the difficulty of processing large and thick laminates in a batch process is due to the anisotropic nature of the resin flow and volatiles outgassing along the fiber direction and between the plies.

Attempts at vacuum curing composite laminates have only been partially successful because even in high vacuum, such as $5 \times 10^{-4}$ mm Hg., compression of the laminate has not been great enough to force sufficient removal of the entrapped air from within the laminate. As such, vacuum cured composite laminates tend to be highly porous with mostly unsatisfactory mechanical and physical properties.

While composite parts formed using prepreg-type materials and an autoclave have been satisfactory from a structural standpoint, it has long been desired to eliminate the use of expensive raw materials and equipment such as an autoclave with a method for fabricating composite structures which produces a high quality laminate beginning with the least expensive raw material forms and automated equipment which produces the finished composite part in-situ without the use of vacuum bagging materials or an autoclave. This is basically due to (1) the considerable effort expended to create the prepreg-type material which is in itself only an intermediate product and, generally, it is manufactured to exacting standards thus demanding a high price; (2) the prepreg-type material which is catalyzed and is an activated product, and therefore possesses a finite shelf life, generally less than a year if stored below 0 degrees F. and only 1 to 2 weeks at room temperature; a factor which makes fabrication of large composite structures difficult; (3) the aging of the prepreg-type material, whereby all subsequent processes in the fabrication sequence must be rigidly controlled, e.g., humidity, temperature, out time, to avoid problems during curing; (4) the high cost of autoclaves as compared to conventional ovens; (5) high tooling costs, both initial and maintenance, which would be significantly reduced because of both simplification and a decreased severity of the curing conditions; (6) component rejection rates, which would be minimized due to an elimination of complex curing cycles and the possible loss of vacuum bag integrity during the critical portion of the cure; and (7) production rates, which would be increased due to the elimination of labor intensive vacuum bagging procedures and reliance upon an available autoclave.

Accordingly, it is abundantly clear that the manufacturing methods of the prior art suffer from a number of disadvantages which have inhibited the more widespread application of advanced composite structures. It is believed that many of these shortcomings have been overcome by the present invention.

SUMMARY OF THE INVENTION

Briefly stated, the present invention contemplates a novel method of provided continuous process/in-situ consolidation and curing of low cost carbon or glass reinforced thermoset materials that are incrementally applied into an advanced composite product having minimum porosity and being relatively void free. The method includes preconditioning a continuous carbon or glass fiber tow to dry the tow to remove any retained moisture and then infiltrating a predetermined amount of neat thermoset resin into the fiber tow. The viscosity of the resin is sufficiently low (fluid) to assure complete saturation of the fibrous material. The resin impregnated fiber tow is then subjected simultaneously to outgassing of volatile gas trapped within the tow and to advancing the stage of cure of the resin to adjust the viscosity of the resin for controlling the bleeding of excess resin from the tow to maintain uniform resin content throughout the part. The staged tow is then applied incrementally to a heated substrate where at the point of application the tow is subjected to further external heat and pressure to consolidate the staged fiber to push out gases or air entrapped in the tow and to advance further the stage of cure of the resin to gelation to maintain consolidation and prevent fiber movement. While the invention is applicable to various types of automated material deposition, in the instance of filament winding the heat is applied by focusing heated air (or other heating methods such a electron beam, ultraviolet, induction, resistance, etc.) to the nip of the application of the tow to the mandrel as pressure by a roller compacts and consolidates the tow and prevents entrainment of air during fiber laydown.

Additional heat and pressure are applied to the outer surface of the tow as it is incrementally wound on the mandrel to advance the resin and to cure it. The combination of the additional heat and pressure combine with the heat of the mandrel to maintain the successive layers of tow at a desired temperature to provide an optimized cure of the tow at a desired temperature, and to minimize undesirable through-the-thickness thermal gradients in the part.

A quality monitoring/verification station preferably inspects the tow as it is being wound on the mandrel so that a limited additional amount of resin may be applied to enrich resin poor areas of the composite and to apply additional compaction forces. Also, preferably, quality monitoring/verification station is coupled to a work station control system, which monitors and controls various steps in the process to ensure that all elements of the product are being kept within specified parameters during the continuous processing of the materials in a serial arrangement. The method is particularly adapted to the manufacture of large filament wound advanced composite structures.

Accordingly, it is apparent that the invention has certain advantages over the prior art processes in that it is able to process large and thick laminates, and closed shell filament wound structures with uniform resin content from ply to ply and near zero porosity. It also allows finite shelf life materials to be utilized on large structures and provided wrinkle free closed shell laminates utilizing male tools. The method is capable of in-line mechanization/automation eliminating a substantial portion of manual labor costs. The method is capable of real time in-process inspection and control, eliminating need for final inspection and is amenable for both prepreg and "wet" (raw fiber/resin) material processing approaches. It is also capable of lowest cost fabrication approach eliminating manual labor, post-processing inspection and repair, and unwarranted material acquisition and scrap costs.

Other features and attendant advantages of the present invention will become apparent to those skilled in the art from a reading of the following detailed description constructed in accordance with the accompanying drawing and wherein:

DESCRIPTION OF THE PREFERRED EMBODIMENT

Figure 1:
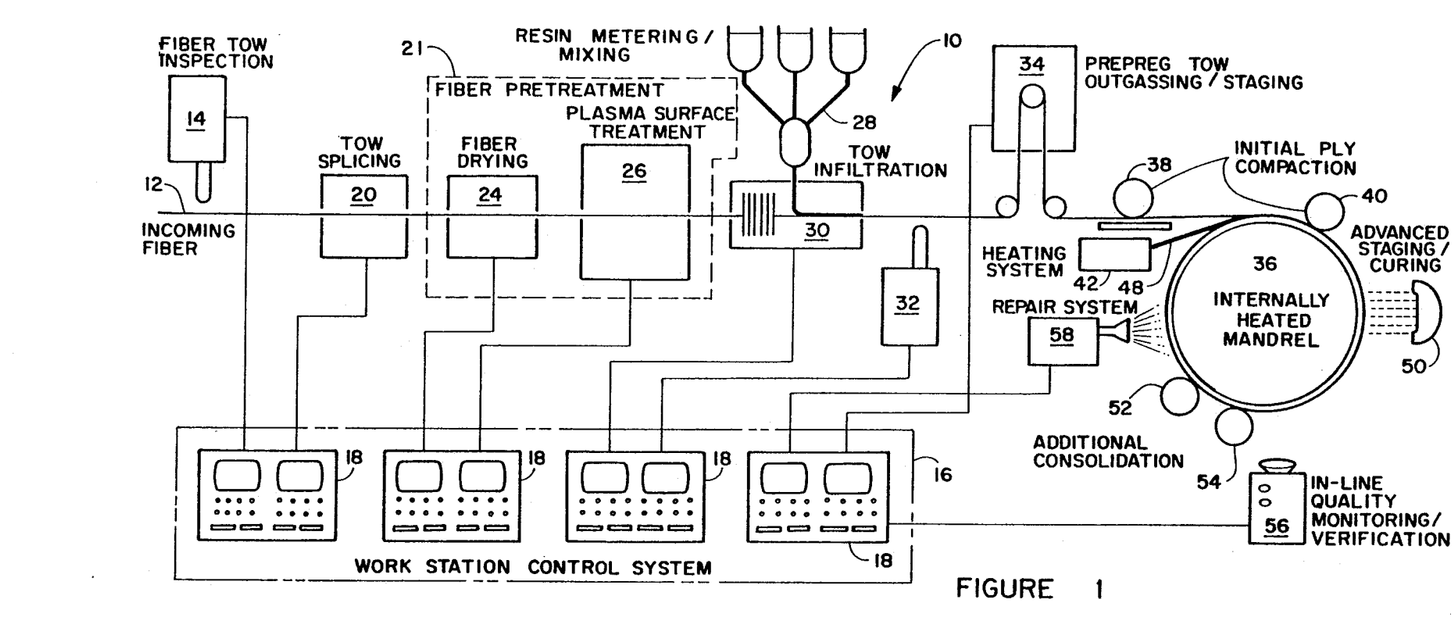
FIG. 1 is a simplified schematic which illustrates a filament winding arrangement utilized to practice the method of the subject invention to provide continuous processing/in-situ curing of thermoset resin matrix composite materials

Referring now to the drawings in detail and in particular to FIG. 1, the reference character 10 generally designates a filament winding arrangement for the manufacture of advanced composite structures constructed in accordance with a preferred embodiment of the present invention. A suitable carbon or glass fiber tow comprising a plurality of strands e.g., 3K-50K is subjected to a preprocessing step which includes inspecting the tow by means of a suitable fiber tow inspection station 14 at the beginning of the processing line as the tow comes off a creel station (not shown). As multiple tows leave the creel station, they will be scanned/inspected for fiber anomalies, fiber breaks, and ends of spools. This fiber tow inspection station 14 will preferably be coupled to a suitable central control station system 16 which includes a plurality of cooperating control stations 18. When fiber scanning indicates any abnormalities, this information is communicated to the control system 16. The control system 16 then alerts the operator, while also sending commands or instructions to the tow splicing station 20.

The function of the splicing station 20 is to assure a continuous flow of quality fiber tows. It is here that flagged abnormalities are cut from the tow and "re-connected". This station 20 will also connected a fresh fiber spool to the line 12 as a previous spool empties.

The fiber tow 12 then enters a pretreatment station 21 that includes a suitable drying station 24 to remove moisture from the tow 12 before resin impregnation and to further volatilize and remove surface contaminants and to increase surface energy for improved wetting. The drying station 24 is coupled to a work station 18 of the control system 16. It is contemplated that a partial pressure oven could advantageously be used to assist in lowering the moisture vapor boiling point, thereby allowing the removal of moisture from the tow 12 more easily. It will be seen that the lower pressure will also facilitate the removal of gases that otherwise may be restricted between fiber strands within a tow 12, as fiber tension will not be high at this point.

The pre-treatment station may also include a fiber surface pretreatment station 26 which will introduce high concentrations of specific functional groups on the fiber surface to provide reaction sites. This allows for improved resin wet-out of the fiber and optimization of overall composite properties through improved fiber-resin interphase/interface adhesion.

The next sub-system and step in the novel process of the invention is a resin metering/mixing system 28 that automatically dispenses and mixes proper proportions of resin components just before they are applied to the fiber tow 12 in the desired precise amount at the tow infiltration station 30. The object of the resin mixing/metering system is to control the resin content of the impregnated tow to well within plus or minus 1%.

In addition to resin content, pot life if another issue of critical concern with existing resin systems. The batch resin system, with its accompanying resin content control and pot life limitations does not lend itself to the accurate control and extended winding schedules necessary in fabrication of large resin matrix composite structures. However, a real time resin metering/mixing system is ideal for the continuous processing system of the present invention. The ratio of the resin and catalyst will be controlled through metering and mixing (hardener/initiator evenly dispersed throughout the resin) just prior to being applied to the fiber tow 12 at the tow infiltration station 30 by a suitable means such as an injection nozzle (not shown). Since it is necessary that the resin mixing/application rate vary with winding speed, winding patterns, mandrel geometry, etc., the resin metering/mixing system 28 and the tow infiltration station 30 will be interfaced to the work station control system 16 as will an immediately following resin inspection station 32 so that the control system 16 can then ensure that the correct amount of resin is applied to the fiber tow 12 at the appropriate temperature and pressure.

The next step of the continuous processing method of the present invention is an outgassing/staging station 34 where the resin impregnated tow 12 is advanced and staged before it is applied to a suitable substrate. Volatile outgassing and entrapped air are considered to be the chief contributors to porosity in cured composite parts. The conventional vacuum bagging process is generally unable to completely evacuate a laminate; thus, some air and volatiles remain trapped between plies. An autoclave uses high pressure to disperse these gas pockets. Consequently, some gases exit the laminate via vacuum lines, while the remainder become finely dispersed throughout the part. The present invention however provides an easier and more effective method to allow moisture and other volatiles to escape prior to, rather than after, final fiber placement and consolidation. Volatile exit is optimum when resin viscosity is at its lowest.

In order to permit outgassing to occur before fiber placement, the impregnated tow 12 is advanced beyond the typical B-stage. If entrapped air, volatiles have been effectively removed from between fibers or plies before they are consolidated (and before gelation), better quality (void-free) parts can be produced with minimum consolidation pressure.

Figure 2:
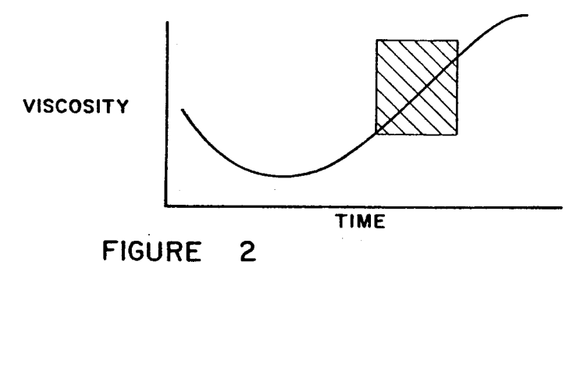
FIG. 2 is a simplified chart which illustrates the viscosity of a typical thermoset resin polymerizing at constant temperature over time. The shaded box represents the optimum viscosity region of the resin for the continuous/in-situ curing processes to be carried out.

The outgassing/staging station 34 serves a dual role not only does it serve to expedite volatile removal before fiber placement, but also it aids in resin content control. When winding a part, the tension from success layers being wound often squeezes the resin from those fibers located against the tool. Additionally, resin content/uniformity control is lost during the cure (even if the part is rotated). When resin is initially heated the viscosity decreases before increasing as cross linking occurs with time. It is during this decrease in viscosity that resin content control is often lost in a part. The second advantage therefore of the staging station 34 is to advance the resin to a point on the curve where it is increasing (but before gelation). Resin content and resin content uniformity within a part, especially a thick laminate, are now more controllable since the advanced (and now outgassed) resin, now increasing in viscosity, is no longer greatly affected by winding tension; nor can it easily flow within or from the part. An understanding of the viscosity of the resin system can more easily be understood by reference to FIG. 2 which shows in the grey shaded area the viscosity of the subject resin system following passage of the fiber tow 12 through the outgassing/staging station 34. This optimum processing window occurs after the resin viscosity begins to increase and ends before approaching gelation.

Thus, when the material is located and placed to form the most recent portion of the composite structure being fabricated, very limited resin flow will occur resulting in highly uniform resin content and distribution throughout the entire composite structure, independent of structure size or laminate thickness.

Figures 3, 4:
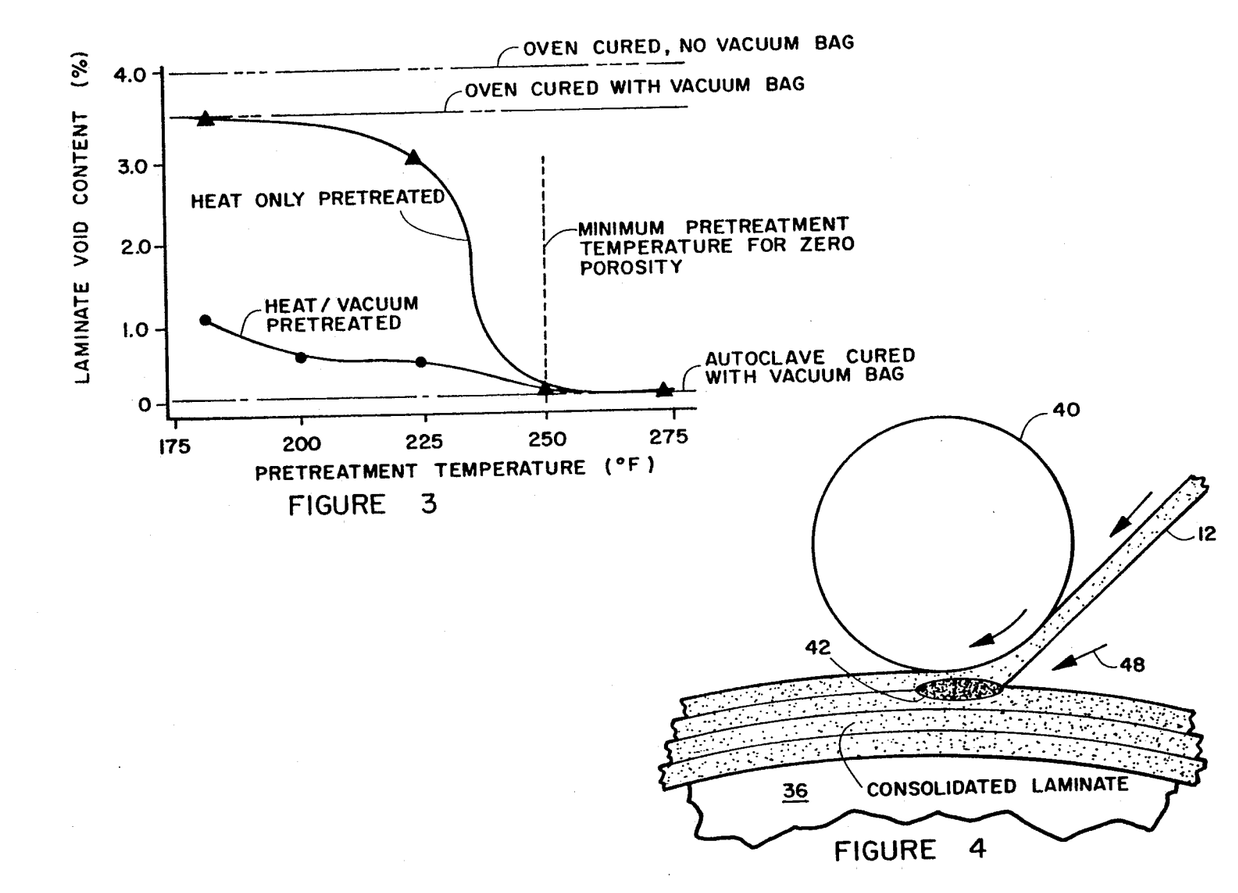
FIG. 3 is a simplified chart which illustrates per cent void content of a laminate for various preheat temperatures for the method of the subject invention and for other methods of making advanced composite products.
FIG. 4 is a partial schematic which illustrates the application of heat pressure to the resin matrix fiber tow for initial consolidation as provided in FIG. 1. Because the heat and pressure are applied in a localized region during fabrication, scale-up concerns from relatively small to very large parts are minimized.

Referring to FIG. 3, the need to maintain a partial vacuum in the heated chamber 34 to assist the outgassing process, as the decrease in pressure correspondingly lowers the boiling point of moisture and volatiles dispersed in the resin impregnated tow 12 is illustrated. While there is some indication that the vacuum in the outgassing/staging station may not be necessary, depending on the temperature and the viscosity of the particular resin system used to impregnate the tow 12 will be the determining factor.

The heating system of the outgassing/staging station 34 will be interfaced with the control system 16. The temperature will be controlled as a function of the resin system utilized and the winding speed. Provision is included in the control system for quick cool down of the staging oven 34 to prevent resin advancement or degradation in the event that the continuous winding process shuts down for any reason.

Once the resin impregnated tows 12 are staged, they are consolidated as the are wound onto a suitable substrate such as a rotatable heated mandrel 36. It will also be understood that the tows 12 may be formed into a suitable band if desired by passing the tows 12 through a suitable ring for example. Other arrangements are known for forming a suitable band, if so desired. A preconsolidation step may occur by an initial compaction of the tow 12 by a heated roller or shoe 38 applying pressure to the tow 12. This in-process ply compaction seen most clearly in FIG. 4, is accomplished through the use of a consolidation hot head 40. The function of the hot head 4 is to provide localized heating at the tow 12 touch-down point on the mandrel 36 or upon previously incrementally applied plies. The hot head 40 compacts the heated area 42 at the touch-down point to squeeze out or push out entrapped air. Also, the hot head 40 maintains a consolidation pressure (with the aid of winding tension) until the resin in the tow is gelled thereby permitting concave surface winding if desired.

In utilizing the hot head 40, another source of heat for application in the local area of pending contact between the staged tows and the existing substrate 36 is provided. Many varied heating methods may be employed, such as those used for in-situ thermoplastic winding/consolidation (i.e.,YAG laser 46 directing a laser beam 48, hot gas, quartz or infrared lamps, induction heating resistance heating, and other heating means previously described) are equally applicable means for the in-situ thermoset filament winding consolidation hot head application.

The second and chief purpose of the consolidation hot head arrangement is to compact the heated area at the point of continuous advancement. In this way, any air that could potentially be trapped between the substrate 36 and the tow 12 being compacted will be pushed out in front of the lay down point. It is better to completely remove entrapped air before consolidation rather than after (an autoclave finely disperses gas pockets that are not removed). Preferably, a heated roller 40 is used as the compaction device to achieve improved consolidation.

It should also be noted in FIG. 4 that compaction of the tow 12 itself also takes place before it is wound on the mandrel 36. The purpose here is to spread the tow 12 and consolidate the fibers within the tow. This aspect is particularly important when winding with large tow (50K-200K) fiber, as these fiber strands tend to be more tenacious than smaller tow fibers.

A third function of the hot head arrangement of FIG. 4 is to maintain consolidation pressure until the resin is sufficiently advanced (gelled) such that further shifting or movement of fiber tows is eliminated. This is accomplished by maintaining tension and compaction on the fibers. The consolidation hot head arrangement will also eliminate the problems of wringling and bridging and potentially assist in winding of concave surfaces.

One of the primary cost drivers of resin matrix composite structural fabrication is the expense incurred in the purchase and operation of a autoclave or oven necessary for curing. This is of particular concern for large composite structures. To eliminate the need for autoclaves or ovens, advanced staging/curing will be accomplished in the present invention by applying heat at the winding touch-down point, as previously described. An internally heated substrate such as the mandrel 36 upon which the tow 12 is incrementally applied will establish a controlled thermal gradient such that the resultant composite part cures from the internal plies outwardly. The advanced state of the resin during lay down minimizes the thermal energy required to achieve gelation and cure. Also, several external heating sources 50 apply additional heat and a thermally equilibrated environment for the part during cure. Thus, differential cure shrinkage, which leads to significant residual stress build-up in the composite part, is alleviated. Further pressure is applied as may be required by additional rollers 52 and 54 which are preferably heated to provide addition consolidation to the incrementally applied plies of tow 12.

Preferably, the invention also includes an in-line quality monitoring/verification station 56 which is coupled to the work station control system 16 for monitoring and control of fiber infiltration, resin viscosity and degree of cure. Also, preferably, a repair system 58 is provided which cooperates with the in-line quality monitoring/verification system and the control system 16 to apply additional resin, for example, if resin poor areas on the incrementally applied tow 12 are sensed.

An example of a carbon fiber/epoxy system that has been successfully used in the practice of the present invention is a T300/934 system which shows very low porosity levels for parts preprocessed at the high end of the preprocessing range as seen in FIG. 3 (250-275 F). Consequently, whether vacuum pretreatment would be required during the preprocessing step would depend upon the particular resin system employed. The T300 carbon fiber tow is available from Amoco Performance Products. The 934 resin system is available from ICI Fiberite.

Figure 5:
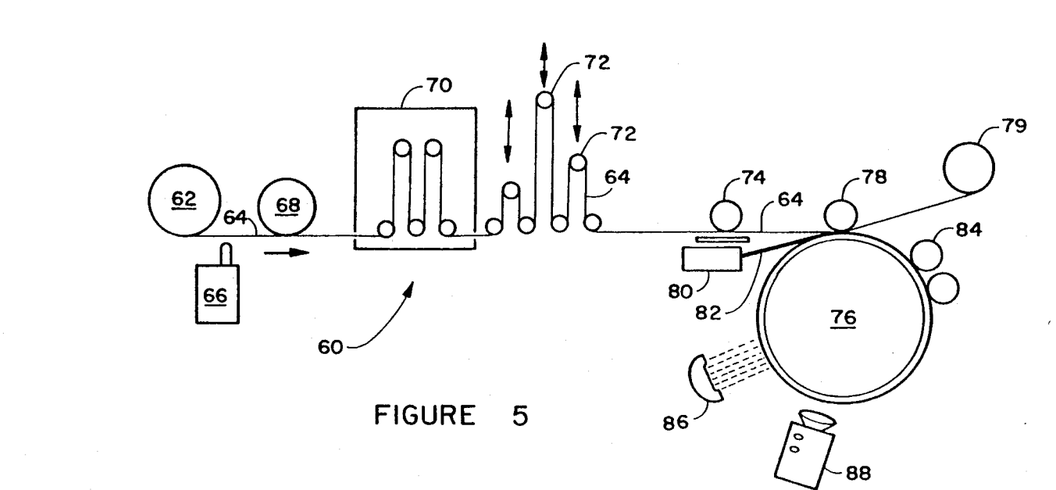
FIG. 5 is a simplified schematic which illustrates another filament winding arrangement to practice the subject method to provided continuous processing/in-situ curing of thermoset prepreg resin matrix composite materials.

Referring now to FIG. 5, an alternative embodiment of the invention is illustrated. In the arrangement 60, a roll 62 of prepreg tow 64 is subjected to a suitable fiber tow inspection station 66 for determination of any shortcomings as previously discussed. A suitable release paper 68 is applied to the tow 64 for ease of handling. The tow 64 is then subjected to a suitable outgassing/staging station 70 for the purposes previously 10 discussed in detail. The tow 64 then is passed over a plurality of biased movable take up rollers 72 which ar controllable for controlling the speed of the tow 64 through the process. The tow 64 is then initially compacted by the heated roller 74 which applies heat and pressure to the tow 64. The tow 64 is then applied to a suitable heated substrate 76 such as a rotatable heated mandrel 76 while a suitable heated roller 78 applies heat at the point of consolidation and an additional heat source 80 directs a flow 82 of heated air or heat from another heat source to the nip of the application of the tow 64 to the mandrel 76. A suitable take up reel 79 removes the release paper from the tow 12 at this point after avoidance of gumming up of intermediate rollers with resin has been precluded.

Additional consolidation of the tow 64 on the mandrel 76 is provided by additional heated rollers 84, as may be required, and additional staging/curing of the tow 64 is provided by additional heaters 86 which cooperate with the heat provided internally by the heated mandrel 76 to completely cure the tow as it is incrementally applied to form one unitary composite product that has limited porosity and is relatively void free so as to avoid the problem of delaminations prevalent in the prior art. As before, in-line quality monitoring/verification means 88 ensure that the process is operating within predetermined parameters so that appropriate adjustments may be made as required.

Figure 6:
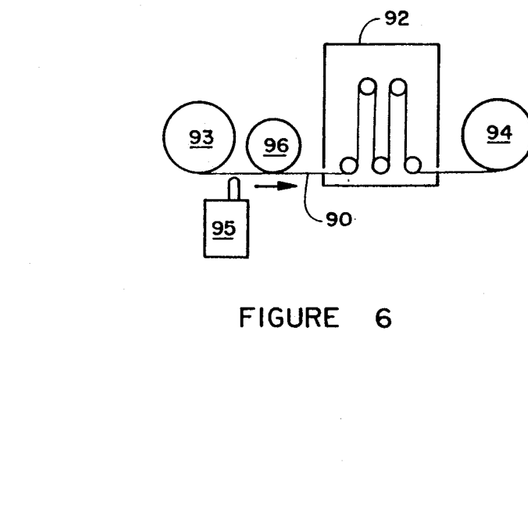
FIG. 6 is a schematic which illustrates an arrangement for preconditioning and advancing resin impregnated fiber tow for further use in the method of the subject invention.
Figure 7:
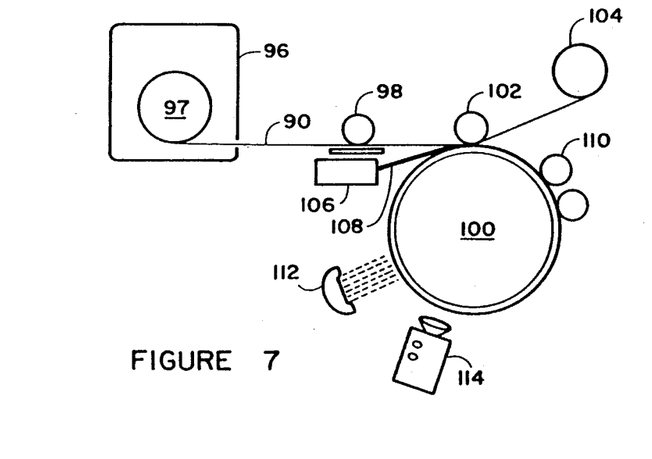
FIG. 7 is a simplified schematic which illustrates a filament winding arrangement which is used in combination wit the tow preconditioning arrangement of FIG. 6 to practice the invention in an off-line arrangement.

In FIGS. 6 and 7, another embodiment of the invention is illustrated. For purposes of appropriate throughput of the particular facility used to practice the invention and for correct utilization of the equipment various alternative embodiments of the invention are readily apparent. In FIG. 6, the tow or tape 90 has been impregnated with resin and placed in a roll 92. After being suitably inspected by a fiber tow or tape inspection station 94, the tow or tape 90 is applied to a release paper 96 to avoid fouling of subsequent rollers by excess resin in the tow 90. The tow or tape 90 is then subjected to a suitable outgassing/staging station 92 as previously taught by the invention and stored at room temperature temporarily as a roll 94 of Beta-staged prepreg tow or tape. For present purposes, the term "Beta staging" is used to describe the state of the resin between common "B" stage (prepreg) and "C" stage (fully cured resin). Although the resin state cannot be concisely described, and varies depending upon the particular resin system, it is effected by a heat and pressure(vacuum) treatment operation determined empirically. The advancement of the resin, or increase in viscosity, to the beta-staged condition is seen best in the graph of FIG. 2.

One key advantage of the beta-staged condition in this application of its use is the advancement of the resin to a state to sufficiently retard ambient polymerization, or aging, common to all prepreg products. Thus, after the operation described in FIG. 6, the once age-sensitive prepreg material is now in a state whereby the material can be stored for large periods of time (indefinitely for present purposes) at ambient conditions without concern over aging, thereby eliminating the need for freezer storage. In effect, the thermosetting resin is in a quasi-thermoplastic state after Beta-staging.

In FIG. 7, the roll 94 of Beta-staged prepreg tow or tape is then placed in a suitable "softening" oven 96. The tow or tape 90 is then subjected to initial consolidation by heated roller 98 before being applied to an internally heated mandrel 100. As consolidation takes place, the tow or tape 90 is applied to the mandrel 100 by a heated roller 102. A suitable release paper take-up spool 104 carries away the release paper from the tow or tape 90. As taught by the invention, a nip point heating source 106 focuses a concentrated stream of heat to the nip of the application of the tow or tape 90 to the mandrel 100. Additional heated rollers 110 and additional heaters 112 apply additional heat and pressure to the tow or tape 90 for advancement and curing of the tow or tape 90 as previously taught. An in-line quality verification/monitoring station 114 monitors the progress of the curing of the product as before to ensure operation with prescribed parameters.

Figure 8:
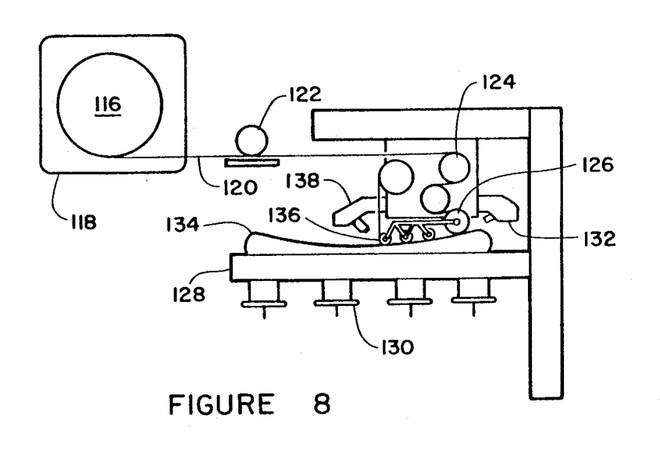
FIG. 8 is a simplified schematic illustrating another embodiment of the invention which is used in combination with a prepreg tape preconditioning arrangement to provide a novel tape laying arrangement.

Referring to FIG. 8, an application of the invention of an automated material deposition system of the tape laying type is illustrated. As seen in FIG. 6, a spool of Beta-staged tow or tape has been formed into a roll 116 of Beta-staged prepreg tape has been placed in a suitable pretreat "softening" oven. Prepreg tape 120 is then subjected to initial tape compaction by application of pressure by a heated roller 122 to control thickness and to remove entrapped air. The tape 120 is then passed over a plurality of suitable rollers 124 to a roller which is heated to provide hot head consolidation as the tape is applied to a suitable heated tool substrate 128 which receives heat from a plurality of heaters 130. Additional heating is applied at the nip point of the roller 126 as the tape is incrementally applied to form the product 134. Additional heated rollers 136 apply heat and pressure for additional consolidation and curing of the product 134 in cooperation with the heated mandrel 128. An in-line quality monitoring/verification station 138 provides void and delamination detection.

Figure 9:
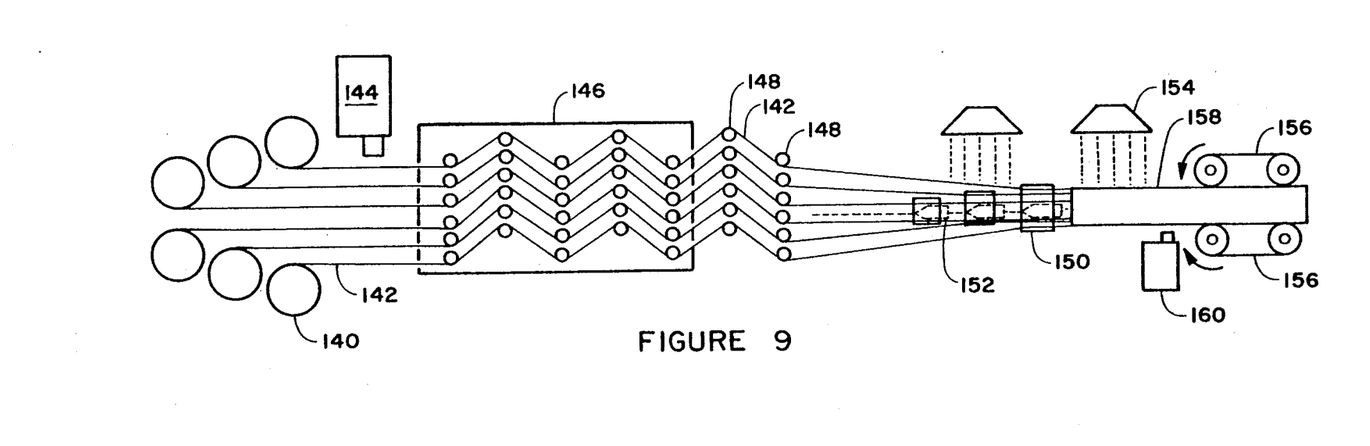
FIG. 9 is a simplified schematic that illustrates a pultrusion arrangement to practice the invention. This is particularly applicable to thick section pultrusions which are susceptible to high porosity and internal cracking using prior art processing.

In FIG. 9 it will be seen how the invention may advantageously applied to a pultrusion method of manufacturing thermoset resin matrix composite structures. A plurality of rolls or spools 140 of dry fiber or prepreg tow 142 have the tow or fiber 142 inspected by a fiber tow inspection station 144 and subsequently subjected to a suitable outgassing/staging station 146 as previously taught. If dry fiber is used it is subjected to resin impregnation by wet resin through resin mixing/metering injection or by being passed through a resin bath prior to being subjected to the outgassing/staging station 146. The suitably outgassed/staged tow 142 is then placed over a plurality of suitable take-up rollers 148 to control rate. The tow 142 is then passed through a plurality of incremental sequential pultrusion dies 150 placed around a suitable heated mandrel 152 while being subjected to suitable heat from heaters 154 and suitable pressure from pressure rollers 156 to additionally stage and cure the product 158. A suitable in-line quality monitoring/verification station is provided.

In summary, various embodiments of the invention have been illustrated showing the application of the invention to alternative automated material deposition systems. These embodiments include fiber preprocessing that includes inspection, splicing, drying, and possibly plasma surface treatment. Resin metering and mixing permit in-line tow impregnation. The resin impregnated fiber is then outgassed and Beta-staged. As the plies are then incrementally applied to a heated substrate such as a rotating mandrel there is ply compaction provided by focused heat applied to the nip of a heated roller consolidating the tow at the point of application to the mandrel for advancing the stage and curing the tow on the mandrel. Additional staging and curing of the tow is provided in cooperation with the heated mandrel. Preferably intelligent process monitoring including possible thermographic inspection and repair of the composite product in process is provided. Appropriate control systems are provided to monitor and control the process.

Although arrangement and method of the present invention has been shown as described with reference to particular embodiments, nevertheless, various changes and modifications obvious to one skilled in the art to which the invention pertains are deemed within the purview of the invention.

We claim:

1. A method for continuous processing/in-situ curing of incrementally applied fiber reinforced thermoset resin matrix materials into a composite product, which comprises the steps of:

preconditioning at least one continuous fiber tow comprising a multiplicity of strands to dry the fiber tow to remove any retained moisture;

infiltrating a predetermined amount of thermoset resin mixed just prior to application into the fiber tow;

subjecting the resin impregnated fiber tow simultaneously to outgass volatile species trapped within the tow and to advance the stage of cure of the resin to a partial cure and to adjust the viscosity of the resin impregnating the fiber tow for controlling bleeding of excess resin from the tow;

applying heat and pressure to the resin impregnated and partially cured fiber tow to initially consolidate the fiber tow as well as the laminate build-up to push out gases or air entrapped within the tow and to advance further the stage of cure of the resin impregnated fiber tow beyond "B" stage to the gelation state to control bleeding of excess resin from the tow; and applying additional heat and pressure to the advanced staged tow at locations adjacent to the initial consolidation in a continuous operational process to complete the cure of the impregnated fiber tow into a cured composite product that is relatively void free.

2. The method claim 1 wherein the preconditioning step includes inspecting the fiber tow for fiber anomalies, fiber breaks and ends of tow and correcting such shortcomings and reconnecting the fiber tow into one continuous length of fiber tow.

3. The method of claim 2 wherein the preconditioning step further includes removal of any retained moisture by passing the continuous fiber tow through a partial pressure oven which assists in lowering the moisture vapor boiling point, thereby allowing removal of moisture more easily and by lowering fiber tension facilitating removal of gases that may otherwise be restricted between fiber strands within a tow.

4. The method of claim 3 wherein the preconditioning step further includes subjecting the dried tow to surface treatment for further volatizing and removing surface contaminants, increasing surface energy for improved wetting and introducing high concentrations of specific functional groups on the fiber surface to provide reaction sites for interfacial bonding.

5. The method of claim 2 wherein the infiltration step further includes mixing the components of the resin system immediately prior to application to the fiber tow and controllably injecting the mixed resin into the fiber tow, the resin mixing and application rate may be varied according to changing requirements of the complete processing of the resin impregnated fiber tow.

6. The method of claim 5 wherein the step of simultaneous outgassing and advancing the stage of the resin impregnated fiber tow includes passing the resin impregnated fiber tow through a heated chamber having a predetermined temperature for a predetermined length of time for removing entrapped air and volatiles from and between fiber strands of the resin impregnated fiber tow and advancing the resin beyond a B-stage for the resin but before the resin has reached the gelation stage.

7. The method of claim 6 which further includes maintaining a partial vacuum within the heated chamber to assist in the outgassing process by lowering the boiling point of moisture and volatiles dispersed in the resin impregnating the fiber tow.

8. The method of claim 6 wherein the consolidation step includes applying the partially cured fiber tow to a heated substrate.

9. The method of claim 8 wherein the consolidation step includes providing localized heating at a point of contact of the tow upon the substrate and compacting the heated area of the tow as it contacts the substrate with a heated roller to squeeze out any entrapped air.

10. The method of claim 9 wherein the consolidation step includes maintaining the consolidation pressure until the resin is gelled.

11. The method of claim 10 which further includes applying additional external heat to the tow after it is placed on the heated substrate to provide in cooperation with the heated substrate a thermally equilibrated environment for the tow during completion of the cure of the resin.

12. The method of claim 11 which further includes applying additional pressure to the fiber tow after it has been placed on the heated substrate during the initial consolidation step to provide additional consolidation during the advance staging of curing of the resin.

13. The method of claim 11 which further includes inspecting the resin impregnated fiber tow after it has been placed on the substrate to detect anomalies in the consolidated tow.

14. The method of claim 13 wherein the inspecting step includes inspecting the consolidated fiber tow.

15. The method of claim 14 which further includes applying additional resin to tow placed on the substrate if the inspecting step determines that the fiber tow is deficient in resin to bring a level of resin in the tow to a desired level and additional subsequent consolidation of the resin into the product.

16. The method of claim 15 which further includes providing a control system for continuous monitoring and controlling the preconditioning step, resin infiltrating step, and the inspecting step for promptly identifying and correcting the steps of the process if the inspections reveals that in some aspect the tow is not meeting specified parameters.

17. The method claim 16 which further includes providing for the control system to be responsive to the inspection of the most recently placed fiber tow on the substrate to controllably apply additional resin to such tow as determined by the inspection.

18. The method of claim 17 which further includes controlled relative movement between the substrate and the point of initial consolidation of the tow upon the substrate to permit additional layers of tow to be incrementally applied to that which has been previously placed on the substrate.

19. The method of a claim 17 wherein the substrate is a rotatable internally heated mandrel upon which a plurality of resin infiltrated fiber tows may be wound under tension over a specified path.

20. The method of claim 1 wherein the resin impregnated fiber tow is formed into a tape having a predetermined width and is applied to a heated substrate having at least one generally planar tool surface, heat is applied to a surface of the substrate opposed to the surface of the substrate receiving the tape.

21. The method of claim 1 which includes providing a plurality of fiber tows and the consolidating step further includes pulling the outgassed and advanced staged resin impregnated fiber tows through a plurality of incremental heated trusion dies onto an internally heated mandrel to form a cured pultrusion composite part.

22. A method for continuous processing/in-situ curing of incrementally applied fiber reinforced thermoset resin matrix materials into a unitary composite product which comprises the steps of:

subjecting a continuous fiber tow comprising a plurality of strands that has been pre-impregnated with a resin matrix simultaneously to an outgassing of moisture and volatile gases trapped within the tow and to advancing the resin to adjust the viscosity of the resin impregnating the fiber tow for controlling bleeding of excess resin from the tow;

applying heat and pressure to initially consolidate the staged fiber tow on a heated substrate to push out gases or air entrapped within the tow and to advance further the staging of cure of the resin impregnated fiber tow to the gelation stage; and applying additional heat and pressure to the advanced staged tow at a location adjacent to the initial consolidation in a continuous operational process to complete the cure of an incrementally applied resin impregnated fiber tow into a cured unitary composite product.

23. A method for continuous processing/in-situ curing of fiber reinforced thermoset resin matrix materials into a composite produce which comprises the steps of:

positioning a supply of continuous thermoset resin impregnated fiber tow that has been advanced in a controlled heat environment to soften the resin impregnated fiber tow to a desired level;

feeding the softened stage resin impregnated fiber tow from the supply onto a substrate and simultaneously applying heat and pressure to compact the tow for initial consolidation and for advancing the stage of the cure beyond "B" stage to the gelation stage; and applying additional heat and pressure to the initially consolidated fiber tow at a location adjacent to the initial consolidation in a continuous operational process for advanced staging and curing of the tow into a unitary composite product having minimal porosity and being relatively void free.

24. The method of claim 23 which further includes placing the supply of resin impregnated fiber tow onto a suitable release paper substrate which is separated from the resin impregnated fiber tow during the initial consolidation step.

25. The method of claim 25 wherein the softened resin impregnated fiber tow is consolidated onto a rotatable internally heated mandrel whereby a plurality of plies of the resin impregnated fiber tow are wound overlappingly as a desired composite product is built up.

26. The method of claim 25 wherein the initial consolidating of the resin impregnated fiber tow includes applying a predetermined pressure at a point of touchdown of the tow onto the rotating mandrel by a heated roller and directing a predetermined amount of heat at the nip between the touch down point between the tow and the rotating mandrel.

27. The method of claim 26 which further includes providing quality verification/monitoring means for inspecting the tow on the mandrel following the initial consolidation.

* * * * *